2,990,377
ORGANOSILOXANE ESTERS AS EMULSIFYING AGENTS

William C. May, Midland, Mich., assignor to Dow Corning Corporation, Midland, Mich., a corporation of Michigan
No Drawing. Filed Aug. 1, 1955, Ser. No. 525,797
2 Claims. (Cl. 252—312)

This invention relates to novel emulsifying agents and to emulsions of organic solvents in water.

A wide variety of organic solvents are known and are widely used as carriers for hundreds of organic and inorganic chemical compositions in many different applications. It is often desirable to employ organic solvents and particularly solutions of chemical compositions in organic solvents as water emulsions. This has been found to be especially desirable in the case of solutions of silicones in organic solvents.

Silicone fluids, elastomers and resins are well known materials having a solid position in commerce and industry based on their excellent properties and especially upon their superior performance at extremes of temperature. Water emulsions of silicones are very widely known and used, but they have often proved to be unstable and the presence of known emulsifying agents has often proved to be totally undesirable.

The primary object of this invention is to prepare stable organosiloxane-in-water emulsions. Another object is to devise a method whereby organic solvent solutions can be emulsified in water. A further object is to prepare novel emulsifying agents especially suited to use with silicones. Other objects and advantages of this invention are detailed in or will be apparent from the following specifications and the appended claims.

The present invention is concerned with oil-in-water emulsions of (1) organic solvents or solutions of organosilicon compounds or other chemical compositions in organic solvents, said organosilicon compounds being organosiloxanes of the general unit formula

wherein R represents any monovalent hydrocarbon radical or any halogenated monovalent hydrocarbon radical and n has an average value of 1 to 3, (2) a dimethylsilicon ester of a polyalkylene glycol consisting essentially of 5 to 95 mol percent —(CH$_3$)$_2$SiO— units and 95 to 5 mol percent polyalkylene glycol residue units and (3) water.

The organosiloxanes of ingredient 1 supra which are operative in this invention are soluble in organic solvents such as toluene, xylene, methylene chloride and generally in other organic solvents. These organosiloxanes are polymers and copolymers having units of the formula

wherein R represents any monovalent hydrocarbon radical, for example, alkyl radicals such as methyl, ethyl, butyl and octadecyl; alkenyl radicals such as vinyl, allyl and hexenyl; aryl radicals such as phenyl, naphthyl and xenyl; alicyclic radicals such as cyclopentyl, cyclohexyl and cyclohexenyl; alkaryl radicals such as tolyl and xylyl and aralkyl radicals such as benzyl. R can also represent any halogenated monovalent hydrocarbon radical such as trichloromethyl, perfluoroethyl, dibromotrichlorophenyl, chlorofluorocyclopentyl, chloromethylphenyl and iodobenzyl. The R groups attached to any one silicon atom can be the same or different.

The organosiloxanes discussed in the preceding paragraph can have 1, 2 or 3 organic radicals per silicon atom; hence can be composed of units such as RSiO$_{3/2}$, R$_2$SiO and R$_3$SiO$_{1/2}$. Limited amounts of SiO$_2$ units can also be present without departing from the scope of this invention so long as the average number of organic radicals per each silicon atom remains within the range of 1 to 3. These organosiloxanes can be homopolymers of a single unit such as dimethylsiloxane, phenylsiloxane or phenylmethylsiloxane; or they can be copolymers of two or more types of units such as phenylmethylsiloxane and dimethylsiloxane; or they can be physical mixtures of two different polymers or copolymers.

Other chemical compositions which can be dissolved in the organic solvents of this invention and then emulsified in water employing the emulsifying agents of this invention include any organic and/or inorganic chemical composition normally soluble in the said organic solvents, but insoluble in water such as hydrocarbon oils, polyesters, waxes and drying oils.

Any organic solvent which is not miscible with water is operative herein. Examples of such solvents are hydrocarbons, such as benzene, toluene and naphtha; ethers such as diethyl ether and dibutyl ether; esters such as ethylacetate and butylacetate and halohydrocarbons such as chlorobenzene, methylene chloride and carbontetrachloride.

The emulsifying agent employed in this invention is a copolymeric material presumably of the unit formula [—(CH$_3$)$_2$SiOR'O—] wherein R'O represents the polyalkylene glycol residue after condensation of the hydroxyl groups in the polyalkylene glycol molecule or after reaction with a silane. Several methods of preparation of such polymeric emulsifying agents are known and any desired method can be employed without departing from the scope of this invention. They can be prepared, for example, by esterification of a dimethylpolysiloxane with the polyalkylene glycol, by transesterification of alkoxydimethylsilanes with a polyalkylene glycol or esterification of dimethyldihalosilanes with a polyalkylene glycol.

The polyalkylene glycols employed to prepare the above-described emulsifying agents are well known, commercially available materials. Examples of said glycols include polypropylene glycol, polyethylene glycol and polyhexylene glycol.

The organosiloxane or other chemical composition, organic solvent and the defined emulsifying agent are admixed and a dispersion or solution is readily obtained. This mixture is then mixed with the desired volume of water, preferably at least an equal volume of water, and if necessary agitated to form a stable aqueous emulsion.

This invention has a range of utility as broad as the known applications of siloxane emulsions. It can be used for mold release emulsions, car and furniture polish emulsions and so forth.

The following examples will enable those skilled in the art to better understand and practice this invention. These examples are not intended to restrict in any way this invention, the scope of which is properly defined in the appended claims. All parts and percentages in the examples are based on weight unless otherwise specified.

Example 1

An ester was prepared by heating a mixture of dimethylsiloxane cyclic tetramer, a polyethylene glycol having an average molecular weight of 400 and a catalytic amount of sodium hydroxide. Water was removed during the reaction. The ester was anaylzed and found to contain approximately 10 percent —(CH$_3$)$_2$SiO— units, the balance being made up of the polyethylene glycol residue (i.e. polyethylene oxide).

Separate samples of the ester prepared above were added to xylene, toluene, perchloroethylene and Stoddard solvent in the ratio of 1 part of ester to 4 parts of the organic solvent. The ester-organic solvent mixtures were each added to equal weights of water and shaken vigorously. All of the samples produced good emulsions with water.

Example 2

An ester was prepared as in Example 1 from a polypropylene glycol having an average molecular weight of about 400 and dimethylsiloxane cyclic tetramer. This ester was added to the organic solvents as in Example 1 and the mixtures added to water formed good emulsions.

Example 3

20 parts of the ester of Example 2 were added to 80 parts of a solution of equal parts of xylene and a liquid resinous siloxane copolymer composed of 35 mol percent monophenylsiloxane, 29 mol percent monomethylsiloxane, 26 mol percent dimethylsiloxane and 10 mol percent diphenylsiloxane. A dispersion of these materials was easily formed and emulsions were easily obtained by admixing the dispersion with water in the proportions ranging from 3 parts dispersion per 1 part of water to 1 part dispersion per 100 parts water.

Example 4

An ester was prepared in accordance with Example 1 by equilibrating dimethylsiloxane tetramer and the polyethylene glycol of Example 1 to obtain an ester containing 10 percent dimethylsiloxane units and 90 percent polyethylene glycol residue units [i.e. poly(ethylene oxide)]. When this ester was substituted for the ester of Example 1 in the method of Example 1, similar results were obtained.

Example 5

Employing the ester and method of Example 1, solutions of linseed oil in xlyene and carnauba wax in Stoddard solvent were emulsified in water.

That which is claimed is:

1. An oil-in-water type emulsion comprising (a) an organic solvent which is immiscible with water, (b) a chemical composition soluble in (a) and insoluble in water, (c) as the emulsifying agent a dimethylsilicon ester of a polyalkylene glycol wherein the alkylene chain obtains no more than six carbon atoms, which ester consists essentially of 5 to 95 mol percent —$(CH_3)_2SiO$— units and 95 to 5 mol percent polyalkylene glycol residue units and (d) water.

2. An oil-in-water type emulsion comprising (a) an organic solvent which is immiscible with water, (b) an organosiloxane of the general unit formula $$R_nSiO_{\frac{4-n}{2}}$$

wherein R represents a radical selected from the group consisting of monovalent hydrocarbon radicals and halogenated monovalent hydrocarbon radicals and $n$ has an average value of 1 to 3, (c) as the emulsifying agent a dimethylsilicon ester of a polyalkylene glycol wherein the alkylene chain contains no more than six carbon atoms, which ester consists essentially of 5 to 95 mol percent —$(CH_3)_2SiO$— units and 95 to 5 mol percent polyalkylene glycol residue units and (d) water.

References Cited in the file of this patent

UNITED STATES PATENTS

| | | |
|---|---|---|
| 2,386,793 | Hanford | Oct. 16, 1945 |
| 2,441,066 | Hanford | May 4, 1948 |
| 2,476,307 | Klein et al. | July 19, 1949 |
| 2,476,308 | Klein | July 19, 1949 |
| 2,746,982 | Hyde | May 22, 1956 |
| 2,755,194 | Volkmann et al. | July 17, 1956 |
| 2,790,777 | Kirkpatrick et al. | Apr. 30, 1957 |